United States Patent [19]

Ishii et al.

[11] 4,393,177
[45] Jul. 12, 1983

[54] THERMOSETTING RESIN COMPOSITION, PROCESS FOR PREPARATION THEREOF AND CURED PRODUCT THEREOF

[75] Inventors: Takeo Ishii; Masatsugu Ogata, both of Hitachi; Toshikazu Narahara, Tokai, all of Japan

[73] Assignee: Hitachi, Ltd., Tokyo, Japan

[21] Appl. No.: 242,617

[22] Filed: Mar. 11, 1981

[30] Foreign Application Priority Data

Mar. 11, 1980 [JP] Japan .................................. 55/29810
Mar. 12, 1980 [JP] Japan .................................. 55/30354
Mar. 12, 1980 [JP] Japan .................................. 55/30355

[51] Int. Cl.³ .................... C08F 283/04; C08G 73/16; C08L 79/08
[52] U.S. Cl. .................................... 525/422; 525/175
[58] Field of Search ............................... 525/422, 175

[56] References Cited

U.S. PATENT DOCUMENTS 3,883,486  5/1975  Bargain ............................. 525/422
4,144,284  3/1979  Semanaz et al. ..................... 525/422

FOREIGN PATENT DOCUMENTS 56-26921  3/1981  Japan .............................. 525/422

*Primary Examiner*—Paul Lieberman
*Assistant Examiner*—Robert E. L. Sellers
*Attorney, Agent, or Firm*—Antonelli, Terry & Wands

[57] ABSTRACT

The present invention relates to a thermosetting resin composition, a process for the preparation of this composition and a cured product obtained by heating and curing this composition. Both the thermosetting resin composition and cured product of the present invention comprise triallylisocyanurate (TAIC) and a poly(-phenylmethylene)polymaleimide represented by the following general formula:

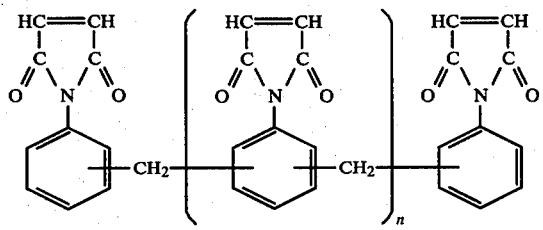

wherein n is a number of at least 1. This composition is obtained by heating and dissolving the polymaleimide into TAIC. According to the intended use of the molded product, various additives may be added to the composition. For example, there may be added a radical-polymerizable thermosetting resin such as an unsaturated polyester, an epoxy acrylate resin or a diallyl phthalate prepolymer and a filler represented by a thermoplastic resin. The composition of the present invention is excellent in the compatibility and therefore, a good moldability is obtained at the molding step. Furthermore, the cured product of the present invention is excellent in the mechanical properties, electric properties and heat resistance.

24 Claims, No Drawings

THERMOSETTING RESIN COMPOSITION, PROCESS FOR PREPARATION THEREOF AND CURED PRODUCT THEREOF

BACKGROUND OF THE INVENTION

The present invention relates to a thermosetting resin composition, a process for the preparation of this composition, and a cured product obtained by heating and curing this composition.

Thermosetting resins are now broadly used for not only electric parts and electronic but also parts of various machines such as automobiles and business machines. In parts of machines, application conditions have become severe, and development of materials excellent in the heat resistance, mechanical properties and electric properties is eagerly desired.

As the material excellent in the heat resistance, aromatic polyimides and aromatic polyamides are known and they are used as coating materials for enameled wires. Although these materials are excellent in the heat resistance, mechanical properties and electric properties, the curing temperature is as high as about 300° C. and since curing is accomplished by dehydrating ring closure reaction, water is formed as a by-product and the molding operation becomes troublesome.

We made researches with a view to developing molding materials (inclusive casting materials; casting materials will be included in molding materials hereinafter) having properties suitable for machine parts, and found that a fluid resin composition comprising polymaleimide is satisfactory. A bismaleimide type resin composition similar to this polymaleimide resin composition was already proposed in Japanese Patent Publication No. 13676/78. This known composition is characterized in that the composition comprises an allyl ester of a polyvalent carboxylic acid and a mono- or bis-maleimide. Most of maleimide compounds are solid at room temperature and in order to obtain homogeneous fluid compositions comprising maleimide compounds, it is necessary that the maleimide compounds should be dissolved at temperatures substantially higher than the melting points thereof in reactive solvents (liquid cross linking agent; the same will apply hereinafter). However, as the solution temperatures are lowered, the maleimide compounds tend to precipitate in the form of crystals from the solutions. To our surprise, it was found that a polymaleimide has a good compatibility with a reactive solvent and a solution of a polymaleimide in a reactive solvent is homogeneous and stable even at low temperatures and therefore, impregnation or casting can easily be accomplished by using this solution without particular heating. It also was found that the resulting cured product is excellent in the resistance to thermal degradation.

SUMMARY OF THE INVENTION

It is therefore a primary object of the present invention to provide a thermosetting composition having an excellent workability as a molding material, a process for the preparation of this molding material and a cured product excellent in the heat resistance, mechanical properties and electric properties, which is prepared from this molding material.

In accordance with one fundamental aspect of the present invention, there is provided a thermosetting resin composition comprising triallylisocyanurate (1,3,5-triallylisocyanurate, hereinafter referred to as "TAIC") and a polymaleimide represented by the following general formula:

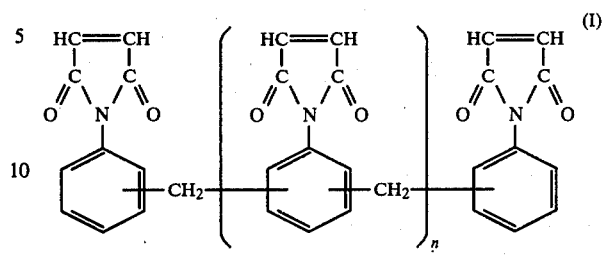

wherein n is a number of at least 1.

In accordance with another fundamental aspect of the present invention, there is provided a process for the preparation of thermosetting resin compositions, which comprises heating TAIC and a polymaleimide represented by the above general formula (I) to form a solution.

In accordance with still another fundamental aspect of the present invention, there is provided a cured product which is obtained by heating and curing a composition formed by heating TAIC and a polymaleimide represented by the above general formula (I) to form a solution.

DETAILED DESCRIPTION OF THE PREFERRED EMBODIMENTS

The polymaleimide represented by the general formula (I) is excellent in the compatibility with TAIC. A compound of the general formula (I) in which n is zero, the compatibility with TAIC is reduced, and the compound is partially crystallized out from the composition at certain storage temperatures. Accordingly, the composition containing such compound is inferior in the stability.

The polymaleimide represented by the general formula (I) may be used in the form of a mixture with a monomaleimide represented by the following general formula (II):

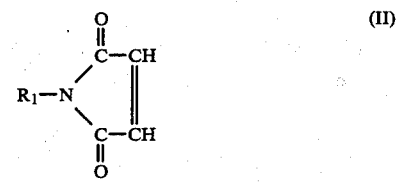

wherein $R_1$ stands for a monovalent organic group such as an alkyl group, an aryl group or an aralkyl group, and/or a bismaleimide represented by the following general formula (III):

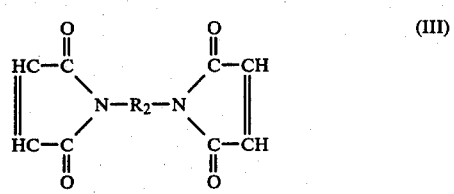

wherein $R_2$ stands for a divalent organic group such as an alkylene group, arylene group or an aralkylene group, and the alkylene group and/or arylene group may be bonded through an oxygen atom.

As the N-substituted maleimide compound represented by the general formula (II), there can be mentioned, for example, N-methylmaleimide, N-ethylmaleimide, N-propylmaleimide, N-butylmaleimide, N-dodecylmaleimide, N-phenylmaleimide, N-p-toluylmaleimide, N-m-toluylmaleimide, N-o-toluylmaleimide, N-p-xylylmaleimide, N-m-xylylmaleimide, N-o-xylylmaleimide, N-α-naphthylmaleimide and N-benzylmaleimide.

As the N,N'-substituted maleimide compound represented by the above general formula (III), there can be mentioned for example, N,N'-ethylenedimaleimide, N,N'-hexamethylenedimaleimide, N,N'-dodecamethylenedimaleimide, N,N'-m-phenylenedimaleimide, N,N'-p-phenylenedimaleimide, N,N'-(oxydi-p-phenylene)dimaleimide, N,N'-(methylenedi-p-phenylene)-dimaleimide, N,N'-2,4-tolylenedimaleimide, N,N'-p-xylenedimaleimide, N,N'-oxydipropylenedimaleimide, N,N'-ethylenedioxy-bis-ethylenedimaleimide, N,N'-phenylethylenedimaleimide and N,N-α-phenylpropylenedimaleimide.

Among these monomaleimides and bismaleimides that are used in combination with the polymaleimide represented by the general formula (I), a bismaleimide having the following formula (IV):

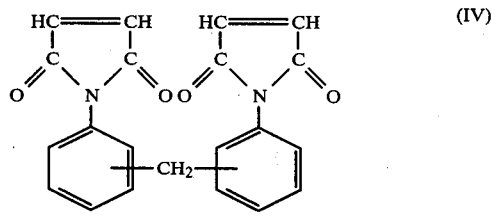

that is, N,N'-(methylenedi-p-phenylene)dimaleimide, is especially preferred. This bismaleimide of the formula (IV) is a compound of the general formula (I) in which n is zero. It is preferred that the bismaleimide of the formula (IV) be mixed with the polymaleimide of the general formula (I) so that the molar ratio of the polymaleimide of the general formula (I) to the bismaleimide of the formula (IV) is at least 1/9. It is especially preferred that the polymaleimide of the general formula (I) be mixed with the bismaleimide of the formula (IV) so that in the resulting maleimide compound mixture, the average number of the maleimide rings per molecule is 2.5 to 7. If this average number of the maleimide rings is smaller than 2.5 in the above-mentioned mixture, the compatibility with TAIC is reduced. If the average number of the maleimide rings is larger than 7, the viscosity of the resulting composition becomes too high and the moldability of the composition is degraded.

A process for the synthesis of the polymaleimide of the general formula (I) is diclosed in, for example, Japanese Patent Application Laid-Open Specifications Nos. 22453/73 and 2339/78. More specifically, the polymaleimide of the general formula (I) can be obtained by dissolving in a solvent such as acetone a polyamide acid obtained by adding maleic anhydride to a polyamide, adding an acetate or the like as a catalyst and acetic anhydride as a dehydrating agent to the solution and carrying out the reaction. A polymaleimide of the general formula (I) in which n is 1 on the average [consisting of a mixture of the polymaleimide of the formula (I) and the bismaleimide of the formula (IV); the same will apply hereinafter] is marketed by Mitsui Toatsu Chemicals, Inc.

TAIC acts not only as a crosslinking agent but also as an agent for reducing the viscosity of the resulting composition. That is, TAIC is used as a so-called reactive solvent. From the results of the tests made by us, it was confirmed a liquid polymerizable monomer other than TAIC is used, physical properties of the cured product at high temperatures are poor and use of such monomer is not preferred.

The mixing ratio of TAIC to the polymaleimide of the general formula (I) and the bismaleimide of the formula (IV) is changed depending on the average molecular weight of the maleimide compound used and the intended use of the resulting cured product, but it is ordinarily preferred that the amount of TAIC be 3 to 300 parts by weight per 100 parts by weight of the mixture of the polymaleimide of the general formula (I) and the bismaleimide of the formula (IV). If the amount of TAIC is smaller than 3 parts by weight, the viscosity of the resulting resin composition is too high and heating is necessary at the step of molding the composition. Accordingly, in this case, the pot life is shortened and incorporation of a filler is limited or the moldability is degraded in some cases. If the amount of TAIC is larger than 300 parts, the defect of TAIC polymer, that is, brittleness, becomes prominent in the cured resin.

Various radical polymerization initiators may be incorporated into the composition of the present invention to promote the curing. Known azo compounds and organic peroxides may be used as such polymerization initiators. For example, there can be mentioned azobisisobutyronitrile, benzoyl peroxide, t-butyl hydroperoxide, dicumyl peroxide, t-butyl perbenzoate, methylethyl ketone peroxide, cyclohexanone peroxide, acetyl peroxide, di-t-butyl peroxide, t-butyl perbenzoate and cumene hydroperoxide. These radical polymerization initiators may be used singly or in the form of a mixture of two or more of them. The kind and amount of the radical polymerization initiator to be used are changed depending on the intended use of the resin composition and the curing conditions required. However, it is ordinarily preferred that the polymerization initiator be used in an amount of 0.1 to 5% by weight based on the total composition.

In addition to (a) a polymaleimide of the general formula (I) or a mixture of said polymaleimide with the bismaleimide of the formula (IV) and (b) TAIC, the resin composition of the present invention may comprise (c) a radical-polymerizable thermosetting resin. This component (c) is effective for further enhancing the moldability of the composition of the present invention comprising the polymaleimide and TAIC. As the component (c), there can be mentioned an unsaturated polyester, an epoxy acrylate resin and a diallyl phthalate polymer.

As the unsaturated polyester, there may be used a known unsaturated polyester compound containing ethylenically unsaturated bonds in the molecular chain and comprising recurring units comprised of dicarboxylic acid units and diol units. An unsaturated polyester comprising isophthalic acid units or terephthalic acid units as the dicarboxylic acid units is especially preferred because the mechanical strength of the molded resin composition can highly be improved without substantial degradation of the heat resistance of the cured product.

As the epoxy acrylate resin, there is preferably used an unsaturated-terminal ester type resin formed by reaction between a 1,2-epoxy resin such as a diglycidyl ether of bisphenol A or a phenol-novolak type polyglycidyl ether and acrylic acid or methacrylic acid.

As the diallyl phthalate polymer, there is preferably used a resin having a molecular weight of about 1,000 to about 5,000, which is obtained by polymerizing a diallyl ester of phthalic acid, isophthalic acid or terephthalic acid.

This third component (c) can exert a similar effect when it is incorporated into a composition comprising a maleimide component other than the polymaleimide represented by the general formula (I), for example, a composition comprising TAIC as the first component and a monomaleimide as the second component.

The mixing ratio of these three components is not particularly critical. However, it is ordinarily preferred that the component (a)/component (b) weight ratio be in the range of from 0.5 to 10 and the total amount of the components (a) and (b) be 60 to 95% by weight, especially 70 to 95% by weight, based on the total amounts of the components (a), (b) and (c). The amount of the component (c) is ordinarily determined while the amount of other component (for example, a thermoplastic resin) described hereinafter is taken into account. In the resin composition of the present invention, if the proportion of the maleimide compound is too small, the heat resistance of the cured product is reduced, and if the proportion of the maleimide compound is too large, the viscosity of the composition is too high and the composition is not suitably used as a solvent-free varnish, and when the composition is used as a matrix of a molding material, the amount incorporated of a filler or fibrous reinforcer is limited. If the amount of the component (c) is smaller than 5% by weight, effects of improving the mechanical strength, adhesiveness and cracking resistance of the cured product are not substantially attained, and if the amount of the component (c) is larger than 40% by weight, the heat resistance of the cured product is reduced.

Various fillers may be incorporated in large amounts into the composition of the present invention according to the intended uses. Any of fillers insoluble in the composition, fillers soluble in the composition and fillers dispersed and precipitated in the composition can be used in the present invention. For example, as the filler, there can be used powdery and granular inorganic substances such as calcium carbonate, magnesium carbonate, zirconium oxide, mica, clay, talc, aluminum hydroxide, magnesium hydroxide, gypsum, dawsonite, borax, silica powder, zirconium silicate, alumina, barium sulfate, kaolin, diatomaceous earth, quartz powder, powdery glass fiber, glass bead, titanium white, graphite, carbon black, molybdenum disulfide, Teflon powder, graphite fluoride, boron nitride and beryllium oxide, and fibrous materials such as glass short fibers, polyamide fibers, nylon fibers, carbon fibers, silicon carbide fibers, potassium titanate fibers, wollastonite fibers, alumina fibers and zirconia fibers. In addition to these ordinary fillers, a thermoplastic resin (d) soluble in the composition may be used. These fillers may be used singly or in the form of a mixture of two or more of them.

The amount incorporated of the filler is determined according to the intended use, but it is ordinarily preferred that the filler be incorporated in an amount of 10 to 75% by volume based on the total resin. If the filler is incorporated, the coefficient of thermal expansion of the cured resin composition is reduced and shrinkage of the molded composition is decreased at the curing step, with the result that occurrence of strain or sink in the molded article, cracking at the curing step and reduction of the dimension precision and surface smoothness can be prevented. If the amount incorporated of the filler is smaller than 10% by volume, shrinkage at the curing step is increased and the amount incorporated of the thermoplastic resin should be increased, resulting in reduction of the heat resistance and mechanical properties. If the amount incorporated of the filler is larger than 75% by volume, kneading by a roll or kneader becomes difficult.

In case of the composition comprising a granular or powder inorganic substance or fibrous material, the shrinkage at the molding step can be maintained at a level much lower than in the composition free of such filler. However, in order to obtain a molded article excellent in the dimension precision, it is necessary that the molding shrinkage of the resin per se free of such granular or powdery inorganic substance or fibrous material should be diminished. A thermoplastic resin (d) is effective as filler for attaining this object. If the components (a), (b) and (d) are mixed at a predetermined ratio, the resulting composition can be molded at a lower temperature (150° to 180° C.) under a lower pressure (50 to 150 kg/cm$^2$) than in case of conventional maleimide type molding materials. Furthermore, the volume shrinkage at the curing step can be reduced and a cured product excellent in the heat resistance, electric properties and mechanical properties can be obtained.

The component (d) is expanded at the curing reaction of the resin comprising the components (a) and (b) as the main components to compensate the shrinkage caused by this curing reaction. Accordingly, the amount added of the component (d) is determined appropriately depending on the coefficient of thermal expansion of the component (d), the total shrinkage of the components (a) and (b) and the intended dimension precision of the molded article. In short, it is preferred to select and use a thermoplastic resin having such a coefficient of thermal expansion in such an amount that the thermal expansion compensating the total shrinkage of the components (a) and (b). For example, it is ordinarily preferred that the component (d) by used in an amount of 1 to 20 parts by weight, especially 3 to 10 parts by weight, per 100 parts by weight of the sum of the components (a) and (b).

Incidentally, in this embodiment, when the third component represented by an unsaturated polyester is used in combination, it is preferred that the third component (c) be incorporated in an amount of 10 to 20 parts by weight per 100 parts of the sum of the components (a), (b) and (c), and if the inorganic filler is used in combination, it is preferred that the inorganic filler be incorporated in an amount of 5 to 10 parts by weight per 100 parts by weight of the sum of the components (a), (b) and (c).

If the amount of the component (d) is too small, the volume shrinkage of the molding material is not substantially compensated, and if the amount of the component (d) is too large, the heat resistance and the mechanical and electric properties at high temperatures are reduced in the resulting cured product.

It is preferred that the component (d) should have a glass transition temperature lower than the curing temperatures of other components of the composition. In this case, the curing temperatures of the components other than the component (d) are higher than the glass transition temperature of the component (d) and therefore, at the actually adopted curing temperature, the coefficient of thermal expansion of the component (d) is enhanced, with the result that the shrinkage-compensating effect is further increased.

As the component (d) incorporated in the composition of the present invention, there can be mentioned, for example, polyethylene, polystyrene, polyvinyl acetate, saturated polyesters, polyethylene terephthalate, polymethyl methacrylate, polyvinyl chloride, polyvinylidene chloride, styrene-acrylonitrile copolymers, ethylene-vinyl acetate copolymers, vinyl chloride-vinyl acetate copolymers, polytetrafluoroethylene, tetrafluoroethylene-hexafluoropropylene copolymers, polychlorotrifluoroethylene, cellulose acetate-butyrol copolymers, polyoxymethylene, polycarbonates, polyphenylene oxide and polypropylene. These resins may be used singly or in the form of a mixture of two or more of them. Of course, a high effect of reducing the molding shrinkage can be attained if other filler such as the above-mentioned granular or powdery inorganic substance is used in combination with such thermoplastic resin.

In addition to the foregoing components, the composition of the present invention may further comprise a stabilizer such as hydroquinone, catechol, t-butylcatechol, t-butylhydroquinone, benzoquinone or t-butylhydroquinone. It is preferred that the stabilizer be incorporated in an amount of 0.001 to 0.5% by weight based on the sum of the components (a) and (b). Furthermore, a coupling agent, a parting agent, a thixotropic agent, an antistatic agent, a coloring material and other additives may be incorporated into the composition of the present invention so as to attain an effect of improving the compatibility of the resins with the fillers or other effects, so far as attainment of the intended objects of the present invention is inhibited.

Because of the presence of TAIC, the viscosity of the resin composition of the present invention can be maintained at a low level and the composition of the present invention can be used as a solvent-free varnish for impregnation or casting at a temperature in close proximity to room temperature, for example, at a temperature lower than 70° C. Furthermore, the composition of the present invention can be used as a solvent-containing laminating or coating varnish for the manufacture of prepregs of glass clothes or mica sheets. Moreover, the composition of the present invention is excellent in the flowability and curing property and the composition of the present invention can be cured at a lower temperature under a lower pressure for a shorter time than in case of polyimide type materials. More specifically, the composition comprising the component (c) and/or the filler together with the component (a) and (b) can be molded at a mold temperature of 150° to 180° C. under a molding pressure of 50 to 150 kg/cm$^2$ for a curing time of 3 to 5 minutes by transfer molding or compression molding, and the obtained molded article is excellent in the heat resistance, mechanical properties and electric properties.

The composition of the present invention can be obtained by adding the polymaleimide to TAIC and heating the mixture to dissolve the polymaleimide.

When the above-mentioned component (c), filler and other additives are used in combination, the starting mixture is kneaded by such kneading means as a kneader, a mixing roll, a Benbury mixer and an extruder. When the above-mentioned component (c) and/or (d) is used in combination, the following three processes can effectively be adopted.

(1) The polymaleimide and other component are added to a solution formed by dissolving under heating the component (c) and/or (d) in TAIC. Since the components (c) and (d) are easily soluble in TAIC, the operation efficiency can be increased by dissolving these components in TAIC in advance.

(2) The polymaleimide is dissolved under heating into TAIC prior to addition of the component (c) and/or (d). According to this process, the amount added of the component (c) or (d) can optionally be adjusted, and the process is especially effective for determining an appropriate mixing ratio according to the intended use.

(3) The polymaleimide is added together with the component (c) and/or (d) to TAIC and the mixture is kneaded under heating. This process is simplest because kneading and dissolution under heating can be accomplished simultaneously.

The present invention will now be described in detail with reference to the following Examples that by no means limit the scope of the invention.

EXAMPLE 1

Poly(phenylmethylene)polymaleimide (M-1) in which the average value of n was 1 and poly(phenylmethylene)polymaleimide (M-2) in which the average value of n was 2 were used as the polymaleimide M, and these poly(phenylmethylene)polymaleimides were compared with N-phenylmaleimide (PM, N-p-acetylphenylmaleimide (p-APM), N,N′-m-phenylenedimaleimide (m-PDM), N,N′-(methylene-di-p-phenylene)-dimaleimide (MPDM) and N,N′-(oxy-di-p-phenylene)-dimaleimide (OPDM) with respect to the solubility in 1,3,5-triallylisocyanurate (TAIC) and the stability of the resulting solution. The mixing ratio, the dissolution state under heating to 130° C. and the behavior of the solution under natural cooling are shown in Table 1.

TABLE 1

| Run No. | Maleimide | Melting Point (°C.) | Maleimide/ TAIC Weight Ratio | Solubility under Heating to 130° C. | Solubility under Cooling to Room Temperature (°C.) |
|---|---|---|---|---|---|
| 1 | M-1 | 115 | 20/80 55/45 80/20 | soluble | soluble |
| 2 | M-2 | 124 | 20/80 50/50 80/20 | soluble | soluble |
| 3 | PM | 87 | 50/50 | soluble | insoluble |
| 4 | p-APM | 158 | 50/50 | insoluble | insoluble |
| 5 | m-PDM | 202 | 50/50 | insoluble | insoluble |
| 6 | MPDM | 156 | 55/45 | soluble | insoluble (crystallization at about 95° C.) |
| 7 | OPDM | 173 | 50/50 | insoluble | insoluble |

In the solutions of runs Nos. 1 and 2, the compatibility of the polymaleimide with TAIC was good, and even if these solutions were allowed to stand at room temperature for more than 3 months, no change was caused.

EXAMPLE 2

The polymaleimide (M-1) used in Example 1 was mixed with TAIC at a ratio shown in Table 2 and the mixture was heated at 80° to 110° C. to obtain a solution. After the solution was naturally cooled, 1.5 parts by weight of dicumyl peroxide was added and dissolved uniformly in the solution. The resulting composition was cast and heated at 90° C. for 5 hours and at 200° C. for 4 hours. The coefficient ($\alpha$) thermal expansion, the glass transition temperature ($T_g$), the thermal decomposition-initiation temperature ($T_d$, the temperature was elevated at a rate of 5° C./min in air) and the flexural strength (kg/cm$^2$, as measured at 25° C.) were determined with respect to the obtained cured product. The obtained results are shown in Table 2.

For comparison, the polymaleimide (M-1) and TAIC were separately cured in the same manner as described above. The obtained results are shown in Table 2.

TABLE 2

| Run No. | Mixing Ratio (parts by weight) | | Properties of Cured Product | | | Flexural Strength (kg/cm$^2$) |
|---|---|---|---|---|---|---|
| | M-1 | TAIC | (°C.$^{-1}$) | $T_g$ (°C.) | $T_d$ (°C.) | |
| 8 | 65 | 35 | 4.9 × 10$^{-5}$ | 250 | 370 | 500 |
| 9 | 45 | 55 | 3.8 × 10$^{-5}$ | 250 | 375 | 470 |
| 10 | 30 | 70 | 3.3 × 10$^{-5}$ | 250 | 370 | 250 |
| Comparative Run 1 | 100 | — | 6.9 × 10$^{-5}$ | 250 | 275 | casting impossible |
| Comparative Run 2 | — | 100 | 3.1 × 10$^{-5}$ | 200* | 355 | measurement impossible |

Note
*measurement was impossible because of cracking of the sample

EXAMPLE 3

A molding material was prepared by mixing additives shown in Table 3 in amounts shown in Table 3 with the resin composition of run No. 1 or 6 described in Example 1 by means of a kneader. Since the molding material formed by using the resin composition of run No. 6 (comparative run No. 3) was highly viscous, it was impossible to incorporate the filler in an amount that could be incorporated into the molding material prepared by using the resin composition of run No. 1. The kneading by the kneader was carried out at 40° C.

The molding material was subjected to transfer molding at a mold temperature of 180° C. under a molding pressure of 80 kg/cm$^2$ for a curing time of 5 minutes, and the flexural strength retention ratio of the obtained test piece at high temperatures was determined. By the term "flexural strength retention ratio" is meant a ratio of the flexural strength at a predetermined temperature to the flexural strength at room temperature (25° C.). The obtained results are shown in Table 4, from which it will readily be understood that the cured product of run No. 11 is superior to the cured product of comparative run No. 3.

Calcium carbonate used as the filler was one having an average particle size of 2.2 μm, supplied by Maruo Calcium Co., Ltd., and finely divided silica used was one supplied in the tradename of "Carplex" by Shionogi and Co., Ltd. The coupling agent used was KBM-503 supplied by Shin-Etsu Chemical Co., Ltd..

TABLE 3

| Component | Mixing Ratio (parts by weight) | |
|---|---|---|
| | Run No. | Comparative Run No. 3 |
| M-1 | 55 | — |
| MPDM | — | 55 |
| TAIC | 45 | 45 |
| dicumyl peroxide | 1.5 | 1.5 |
| calcium carbonate | 287 | 160 |
| glass fiber (3 mm in length) | 33 | 22 |
| finely divided silica | 4 | 13 |
| zinc stearate | 3 | 3 |
| coupling agent | 1 | 1 |

TABLE 4

| Run No. | Flexural Strength Retention Ratio | |
|---|---|---|
| | 150° C. | 200° C. |
| 11 | 98 | 96 |
| comparative run 3 | 83 | 51 |

EXAMPLE 4

In 70 parts by weight of TAIC was dissolved under heating at 80° to 110° C. 30 parts of poly(phenylenemethylene)-polymaleimide (M-3) (average value of n=3, see Example 12). After the solution was naturally cooled, 1.5 parts of dicumyl peroxide was dissolved in the solution uniformly. Then, 350 parts by weight of quartz glass powder (size smaller than 44 μm), 4 parts by weight of zinc stearate and 1 part by weight of KBM-503 were incorporated into the solution, and the mixture was kneaded by a kneader to form a molding material (run No. 12). The molding material was molded at a mold temperature of 180° C. under molding pressure of 80 kg/cm$^2$ for a curing time of 5 minutes. The electric properties, flexural strength retention ratio at high temperatures and molding shrinkage of the molded product were determined. The electric properties and molding shrinkage were measured according to JIS K-6911. The flexural strength ratio was determined based on the flexural strength measured at 2520 C. The obtained results are shown in Table 5.

EXAMPLE 5

In 55 parts of TAIC was dissolved under heating at 80° to 110° C. 45 parts by weight of the polymaleimide (M-1) used in Example 1 and 2. After the solution was naturally cooled, 1.5 parts of dicumyl peroxide was uniformly dissolved, and 240 parts of calcium carbonate, 60 parts of glass fiber (6 mm in length), 4 parts of zinc stearate and 1 part by weight of KBM-503 were added and the mixture was kneaded by a kneader to form a molding material (run No. 13). The molding material was kneaded in the same manner as described in Example 4 and the properties of the molded product were determined to obtain results shown in Table 5.

In order to examine the pot life of the molding material, the spiral flow test was carried out and the results obtained just after kneading were compared with the results obtained after 6 months' standing at room temperature. No substantial change was observed.

TABLE 5

| Electric Properties | | Run No. 12 | Run No. 13 |
|---|---|---|---|
| room temperature (20° C.) | volume resistivity ($\Omega$-cm) | $4 \times 10^{16}$ | $2 \times 10^{16}$ |
| | dielectric loss tangent (%) | 0.3 | 0.4 |
| 200° C. | volume resistivity ($\Omega$-cm) | $1.6 \times 10^{14}$ | $1.0 \times 10^{14}$ |
| | dielectric loss tangent (%) | 0.65 | 0.94 |
| 220° C. | volume resistivity ($\Omega$-cm) | $1.0 \times 10^{14}$ | $2.4 \times 10^{13}$ |
| | dielectric loss tangent (%) | 0.85 | 1.20 |
| Flexural Strength Retention Ratio (%) | | | |
| 100° C. | | 100 | 100 |
| 150° C. | | 100 | 100 |
| 200° C. | | 99 | 102 |
| Molding Shrinkage (%) | | 0.7 | 0.8 |

EXAMPLE 6

A varnish was prepared by dissolving 30 parts of the polymaleimide (M-1), 70 parts by weight of TAIC and 0.5 part by weight of dicumyl peroxide in a methylethyl ketone/methyl cellosolve (1/1). A glass cloth (treated with vinyl silane and having a thickness of 0.18 mm) was impregnated with this varnish and dried at 100° C. for 15 minutes. Eight of the so prepared prepregs were piled and molded at a mold temperature of 180° C. under a molding pressure of 40 kg/cm² for a curing time of 10 minutes to obtain a laminate sheet (run No. 14) having properties shown in Table 6.

For comparison, a laminate sheet was similarly prepared by using a solution of an aminobismaleimide type prepolymer (Kerimid 601 supplied by Rhone-Poulenc Co. Ltd.) in N-methyl-2-pyrrolidone. The properties of the obtained laminate sheet are shown in Table 6.

TABLE 6

| Run No. | Gelation Time (sec., 180° C.) of Varnish | Flexural Strength Retention Ratio (%) | | |
|---|---|---|---|---|
| | | 100° C. | 150° C. | 200° C. |
| 14 | 110 | 100 | 100 | 98 |
| comparative run 4 | 260 | 95 | 90 | 80 |

EXAMPLE 7

The solubility of polymaleimides in TAIC was examined in the same manner as described in Example 1. Mixtures obtained by mixing a polymaleimide in which n was 0, that is, N,N'-(methylene-di-p-phenylene) dimaleimide, and a polymaleimide in which n was 1 at a mixing ratio shown in Table 7 were dissolved in TAIC under heating at 150° C. Then, the solutions were naturally cooled to room temperature and it was checked whether or not precipitation of the polymaleimide was caused. The obtained results are shown in Table 7.

TABLE 7

| Run No. | Maleimide Mixing Ratio | | Precipitation |
|---|---|---|---|
| | n = 0 | n = 1 | |
| 15 | 100 | 0 | observed |
| 16 | 80 | 20 | " |
| 17 | 60 | 40 | " |
| 18 | 50 | 50 | no observed |
| 19 | 40 | 60 | " |
| 20 | 20 | 80 | " |
| 21 | 0 | 100 | " |

From the results shown in Table 7, it will readily be understood that if the ratio of the polymaleimide of n=0 to the polymaleimide of n=1 is higher than 50/50, that is, if the average number of n is smaller than 0.5, precipitation of the polymaleimide is caused under cooling to room temperature and no good results are obtained.

EXAMPLE 8

A resin composition comprising 100 parts by weight of a 1/1 weight ratio mixture of poly(phenylmethylene)-polymaleimide [the average value of n in the general formula (I) was 0.8; hereinafter referred to as "M-4"] and a reactive solvent shown in Table 8 and 1 part by weight dicumyl peroxide was cured by heating the resin composition at 120° C. for 3 hours, at 150° C. for 3 hours and at 200° C. for 15 hours. The glass transition temperature and heating weight loss characteristic of the cured product are shown in Table 8. From the results shown in Table 8, it will readily be understood that if TAIC is used as the reactive solvent, both the glass transition temperature and thermal decomposition temperature of the cured product are high and a cured product having a good heat resistance can be obtained.

TABLE 8

| Run No. | Reactive Solvent | Glass Transition Temperature (°C.) of Cured Product | Temperature (°C.) Causing 10% Weight Loss* |
|---|---|---|---|
| comparative run 5 | styrene | 209 | 385 |
| comparative run 6 | diallyl o-phthalate | 220 | 360 |
| comparative run 7 | diallyl isophthalate | 225 | 395 |
| comparative run 8 | triallyl trimellitate | measurement impossible | 385 |
| comparative run 9 | trially cyanurate | 221 | 375 |
| 22 | TAIC | 230 | 430 |

Note
*sample was gradually heated at a temperature-elevating rate of 5° C./min. in air.

EXAMPLE 9

To a mixture of 40 parts by weight of the polymaleimide (M-2) and 40 parts by weight of TAIC was added 20 parts by weight of an unsaturated polyester, an epoxy acrylate resin or a diallyl isophthalate prepolymer as the third component (c). The mixture was then heated at 120° C. Thus, 3 kinds of compositions were prepared.

The unsaturated polyester used was a terephthalic acid type unsaturated polyester "8542" supplied by Nippon Upica Co., Ltd. The epoxy acrylate resin used was a novolak type epoxy acrylate resin used as the body resin in "PS-6200" supplied by Hitachi Chemical Co., Ltd. The diallyl phthalate prepolymer used was "Daiso Dap 100L" supplied by Osaka Soda Co., Ltd.

Each composition was mixed with 1 part by weight of dicumyl peroxide, 200 parts by weight of quartz glass powder, 50 parts by weight of glass short fiber, 2 parts by weight of a coupling agent and 3 parts by weight of zinc stearate by using a kneader. Thus, 3 kinds of molding materials were prepared.

Each molding material was subjected to transfer molding to form a test piece, and the flexural strength and elasticity were measured. The test piece formed had a size of 120 mm×13 mm×5 mm. The molding was carried out at a mold temperature of 180° C., a molding pressure of 150 kg/cm² for a curing time of 5 minutes. The measurement results are shown in Table 9. The flexural strength of each test piece including the component (c) was highly improved over the test piece (run No. 26) free of the component (c). Thus, it was confirmed that the moldability can be improved by incorporation of the component (c). Furthermore, the flexural strength retention ratio at high temperatures of each test piece including the component (c) was not substantially different from that of the test piece free of the component (c). Accordingly, it was confirmed that mechanical properties at high temperatures are not degraded by incorporation of the component (c).

TABLE 9

| Run No. | Third Component (c) | Flexural Strength (kg/cm²) | | | Flexural Elasticity (10⁵ kg/cm²) | | |
|---|---|---|---|---|---|---|---|
| | | 20° C. | 150° C. | 200° C. | 20° C. | 150° C. | 200° C. |
| 23 | polyester | 992 | 880 | 804 | 1.4 | 1.2 | 1.0 |
| 24 | epoxy acrylate | 955 | 827 | 732 | 1.4 | 1.2 | 1.0 |
| 25 | diallyl phthalate prepolymer | 914 | 812 | 706 | 1.4 | 1.1 | 0.9 |
| 26 | not added | 378 | 360 | 338 | 1.4 | 1.3 | 1.1 |

EXAMPLE 10

Two kinds of varnishes were prepared by dissolving 32 parts by weight of the polymaleimide (M-2), 8 parts by weight of TAIC, 10 parts by weight of the unsaturated polyester or epoxy acrylate resin shown in Example 9 and 0.5 part by weight of 1,1-bis(t-butylperoxy)-3,3,5-trimethylcyclohexane in 50 parts by weight of methylethyl ketone.

An aggregated mica tape (0.24 mm in thickness) backed by a glass cloth (0.05 mm in thickness) was impregnated with the so obtained varnish and dried at room temperature for 24 hours to obtain a prepreg mica tape having a resin content of about 40% by weight. Two of the so prepared prepregs were piled and the curing treatment was carried out under a pressure of 5 kg/cm² at 150° C. for 5 hours and at 180° C. for 5 hours to obtain a laminate sheet. The insulation breakdown voltage and the dielectric loss tangent-temperature characteristic of the obtained laminate were measured to obtain results shown in Table 10.

For comparison, the results obtained by using a varnish formed by dissolving 40 parts by weight of the polymaleimide (M-2), 10 parts by weight of TAIC and 1 part by weight of the above-mentioned peroxide in 50 parts by weight of methylethyl ketone are shown in Table 10.

From the results shown in Table 10, it will readily be understood that both the insulation breakdown voltage and dielectric loss tangent-temperature characteristic can be improved by incorporation of the third component (c).

TABLE 10

| Run No. | Third Component (c) | Insulation Breakdown Voltage (KV/mm) | tanδ* (%) | | |
|---|---|---|---|---|---|
| | | | 20° C. | 150° C. | 200° C. |
| 27 | polyester | 75 | 2.2 | 2.7 | 3.6 |
| 28 | epoxy acrylate | 82 | 2.1 | 2.3 | 2.9 |
| 29 | not added | 30 | 3.5 | 5.5 | 4.5 |

Note
*test voltage = 1 KV

EXAMPLE 11

To 50 parts by weight of the polymaleimide (M-2) was added 50 parts by weight of TAIC, and they were mixed together at about 120° C. Then, the mixture was cooled to about 60° C. and was kneaded with 1 part by weight of dicumyl peroxide, 200 parts by weight of heavy calcium carbonate (having an average particle size of 2.2 μm), 50 parts by weight of silica powder (having an average size of 0.5 μm), 50 parts by weight of glass short fiber (6 mm in length), 2 parts by weight of an organosilane type coupling agent and 3 parts by weight of zinc stearate at 50° C. by a kneader to form a molding material (run No. 30).

The molding shrinkage of the so prepared molding material at the transfer molding was measured according to JIS K-6911. Test pieces having a length of 120 mm, a width of 13 mm and a thickness of 5 mm wer prepared by transfer molding and compression molding machines, respectively, and they were subjected to the bending test. Incidentally, the molding was carried out at a mold temperature of 170° C. under a pressure of 150 kg/cm² for a curing time of 5 minutes. The test results are shown in Table 11. From the results shown in Table 11, it will readily be understood that the molding material of the present invention provides a molded product having a higher strength by compression molding than by transfer molding.

TABLE 11

| Molding Method | Molding Shrinkage (%) | Flexural Strength (kg/cm²) | | Flexural Elasticity (10⁵ kg/cm²) | |
|---|---|---|---|---|---|
| | | 20° C. | 180° C. | 20° C. | 180° C. |
| compression | | 885 | 828 | 1.4 | 1.2 |
| transfer | 0.3 | 341 | 318 | 1.4 | 1.1 |

EXAMPLE 12

In 55 parts by weight of TAIC was dissolved 45 parts by weight of the polymaleimide (M-1) at about 110° C., and 10 parts by weight of polyvinyl acetate, 1.5 parts by weight of dicumyl peroxide, 1 part by weight of KBM-503, 4 parts by weight of zinc stearate, 120 parts by weight of calcium carbonate and 80 parts by weight of glass fiber were added to the solution. The mixture was kneaded in a kneader heated at about 40° C. to form a molding material (run No. 31).

In the same manner as described above, the polymaleimide (M-1) was dissolved in TAIC under heating, the solution was mixed with 5 parts by weight of polymethyl methacrylate, 1.5 parts by weight of dicumyl peroxide, 1 part by weight of KBM-503, 4 parts by weight of zinc stearate, 120 parts by weight of clay and 100 parts by weight of glass fiber, and the mixture was kneaded in a kneader maintained at about 40° C. to obtain a molding material (run No. 32).

Poly(phenylmethylene)polymaleimide was prepared according to the process disclosed in Japanese Patent Application Laid-Open Specifications Nos. 22453/73 and 23396/78. More specifically, 100 parts by weight of a polymaleimide acid obtained by adding maleic anhydride to a polyamine (n being about 3) was dissolved in 350 parts by weight of acetone, and 0.6 part by weight of cobalt acetate, 10 parts by weight of triethylamine and 72 parts by weight of acetic anhydride were added to the solution and the reaction was carried out at 55° C. for 2 hours. The reaction product was cooled to 20° C. and dropped into water, and the formed precipitate was recovered by filtration, washed with water and with methanol and dried to obtain a yellowish brown powder in a yield of 75%. From the results of the infrared absorption spectrum analysis, it was confirmed that the maleimide ring was present in the obtained compound.

Then, 45 parts by weight of the so prepared poly-(phenylmethylene) polymaleimide (M-3, the average number of n being 3) was dissolved in 55 parts by weight of TAIC under heating at 120° C., the solution was mixed with 10 parts by weight of polyvinyl acetate, 1.5 parts by weight of dicumyl peroxide, 1 part by weight of KBM-503, 4 parts by weight of zinc stearate, 200 parts by weight of quartz glass powder and 80 parts by weight of glass fiber, and the mixture was kneaded in a kneader heated at about 40° C. to form a molding material (run No. 33).

In 55 parts by weight of TAIC was dissolved 45 parts by weight of the polymaleimide (M-1) under heating at 120° C., the solution mixed with 1.5 parts by weight of dicumyl peroxide, 1 part by weight of KBM-503, 4 parts by weight of zinc stearate, 240 parts by weight of calcium carbonate and 60 parts by weight of glass fiber, and the mixture was kneaded by a kneader to form a molding material (run No. 34).

For comparison, 70 parts by weight of a terephthalic acid type unsaturated polyester resin (PS-9200 supplied by Hitachi Chemical Co., Ltd.), 30 parts by weight of a iso-phthalic acid type saturated polyester resin (PM9755 supplied by Takeda Chemical Industries Ltd.), 1 part by weight of 1,1-bis(t-butylperoxy)-3,3,5-trimethylcyclohexane (Perhexa 3M supplied by Nippon Oil and Fats Co., Ltd.), 1.5 parts by weight of zinc stearate, 1 part by weight of KBM-503, 200 parts by weight of calcium carbonate and 150 parts by weight of glass fiber were kneaded in a kneader maintained at about 25° C. to form a molding material (comparative run No. 10).

Each of the foregoing molding materials was molded at a mold temperature of 180° C. under a molding pressure of 150 kg/cm$^2$ for a curing time of 5 minutes (in case of the molding material of comparative run No. 10, the mold temperature and curing time were changed to 150° C. and 3 minutes, respectively). The molding shrinkage, flexural strength, mechanical properties and electric properties were determined with respect to each molded product. Incidentally, the molding shrinkage and electric properties were measured according to JIS K-6911, and the surface smoothness was measured by a surface roughness meter. The flexural strength ratios of the flexural strength at 150° C. and flexural strength at 200° C. to the flextual strength at 25° C. were determined. The obtained results are shown in Table 12.

TABLE 12

| Run No. | Shrinkage (%) | Smoothness ($\mu$) | Electric Properties | | | | Flexural Strength Retention Ratio (%) | |
|---|---|---|---|---|---|---|---|---|
| | | | room temperature (20° C.) | | 200° C. | | | |
| | | | ($\Omega$-cm) | tan (%) | ($\Omega$-cm) | tan (%) | 150° C. | 200° C. |
| 31 | 0.01 | 0.5 | $4 \times 10^{16}$ | 0.3 | $7 \times 10^{13}$ | 3.5 | 90 | 80 |
| 32 | 0.04 | 0.6 | $3 \times 10^{16}$ | 0.8 | $1.0 \times 10^{14}$ | 1.5 | 97 | 90 |
| 33 | 0.02 | 1.2 | $4 \times 10^{16}$ | 0.5 | $9 \times 10^{13}$ | 2.2 | 94 | 87 |
| 34 | 0.03 | 3.5 | $2 \times 10^{16}$ | 0.4 | $1 \times 10^{14}$ | 0.94 | 100 | 99 |
| comparative run 10 | 0.01 | 0.8 | $7 \times 10^{15}$ | 2.5 | $5 \times 10^{8}$ | 15 | 45 | 30 |

From the results shown in Table 12, it will readily be understood that the resin composition of the present invention which includes the thermoplastic resin is comparable to the conventional low-shrinkage unsaturated polyester resin molding material (comparative run No. 10) with respect to the molding shrinkage at the curing step and the surface smoothness and although the electric properties and flexural strength retention ratio at high temperatures of this composition are slightly poorer than those of the composition of the present invention free of the thermoplastic resin (run No. 34), the molding material of this resin composition is sufficiently applicable as a heat-resistant molding resin material.

EXAMPLE 13

Eight kinds of molding materials (runs Nos. 35 through 42) were prepared by kneading 30 parts by weight of the polymaleimide (M-4) used in Example 8, 20 parts by weight of a terephthalic acid type unsaturated polyester (8524 supplied by Nippon Upica Co., Ltd.), 50 parts by weight of TAIC, 1 part of dicumyl peroxide, 200 parts by weight by weight of heavy calcium carbonate (average particle size=2.2 $\mu$m), 50 parts by weight of silica powder (average particle size=0.5 $\mu$m), 50 parts by weight of glass short fiber (6 mm in length), 2 parts by weight of an organosilane type coupling agent (KBM-503 supplied by Shin-Etsu Chemical Co., Ltd.), 3 parts by weight of zinc stearate and 15 parts by weight of a thermoplastic resin shown in Table 13 by means of a kneader. Each molding material was subjected to transfer molding at a mold temperature of 170° C. under a molding pressure of 150 kg/cm² for a curing time of 5 minutes, and the molding shrinkage and flexural characteristics of the molded product were determined to obtain results shown in Table 13.

From the results shown Table 13, it will readily be understood that as in Example 12 given hereinabove, also in this Example, the molding shrinkage is drastically reduced by incorporation of the thermoplastic resin and good mechanical properties can be maintained even at high temperatures.

For comparison, a molding material (run No. 43) was prepared in the same manner as described above except that the thermoplastic resin was not added. Properties of this molding material were compared with the above molding materials of runs No. 36 and No. 42. More specifically, each molding material was molded into a VTR cylinder having a diameter of 60 mm, a thickness of 3 mm and a height of 50 mm, and the surface roughness and roundness (the maximum gap of the concave and convex portions from the true circle) were determined to obtain results shown in Table 14. From the results shown in Table 14, it will readily be understood that the surface smoothness and roundness can be improved by incorporation of the thermoplastic resin and a molded product having a good dimension precision can be obtained.

TABLE 13

| Run No. | Thermoplastic Resin | Molding Shrinkage (%) | Flexural Strength (kg/cm²) 20° C. | Flexural Strength (kg/cm²) 180° C. | Flexural Elasticity (10⁵ kg/cm²) 20° C. | Flexural Elasticity (10⁵ kg/cm²) 180° C. |
|---|---|---|---|---|---|---|
| 35 | polyethylene | 0.4 | 876 | 763 | 1.4 | 1.1 |
| 36 | polyvinyl acetate | 0-0.1 | 925 | 821 | 1.4 | 1.1 |
| 37 | ethylene-vinyl acetate copolymer | 0.3 | 882 | 705 | 1.3 | 1.0 |
| 38 | cellulose acetate-butyrate copolymer | 0-0.1 | 904 | 755 | 1.4 | 1.1 |
| 39 | polystyrene | 0.2 | 890 | 798 | 1.4 | 1.1 |
| 40 | polymethyl methacrylate | 0-0.1 | 898 | 754 | 1.4 | 1.1 |
| 41 | polyvinyl chloride | 0-0.1 | 905 | 786 | 1.4 | 1.1 |
| 42 | polypropylene | 0.2 | 888 | 802 | 1.4 | 1.2 |

TABLE 14

| Run No. | Surface Roughness (μm) | Roundness (μm) |
|---|---|---|
| 43 | 2-6 | 15-25 |
| 36 | 0.2-0.6 | 4-6 |
| 42 | 0.5-0.8 | 6-10 |

What is claimed is:

1. A thermosetting resin composition which comprises an admixture consisting of tri-allylisocyanurate, a polymaleimide represented by the following general formula:

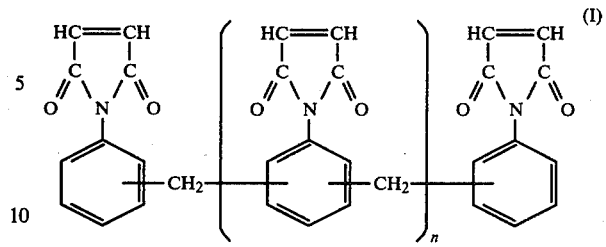

wherein n is a number of at least 1, and a thermoplastic resin, the amount of said thermoplastic resin is 1 to 20 parts by weight per 100 parts by weight of said polymaleimide and said tri-allylisocyanurate, said thermoplastic resin having a glass transition temperature lower than the curing temperatures of other components in said admixture and the amount of said tri-allylisocyanurate is 3 to 300 parts by weight per 100 parts by weight of the polymaleimide.

2. A process for the preparation of thermosetting resin compositions which comprises heating tri-allylisocyanurate and a polymaleimide represented by the following formula:

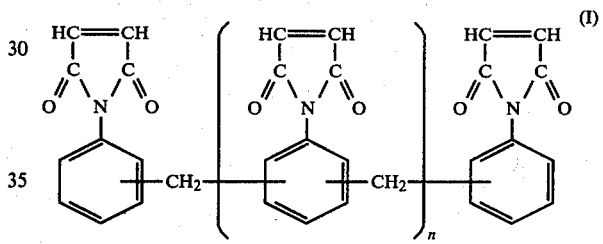

wherein n is a number of at least 1, to form a solution.

3. A process for the preparation of thermosetting resin compositions according to claim 2, wherein a radical-polymerizable thermosetting resin and/or a thermoplastic resin is heated and dissolved in said tri-allylisocyanurate and said polymaleimide is then added to the resulting solution.

4. A process for the preparation of thermosetting resin compositions according to claim 2, wherein said polymaleimide is heated and dissolved in said tri-allylisocyanurate and a radical-polymerizable thermosetting resin and/or a thermoplastic resin is added to the resulting solution.

5. A process for the preparation of thermosetting resin compositions according to claim 2, wherein said polymaleimide and a radical-polymerizable thermosetting resin and/or a thermoplastic resin are simultaneously heated and dissolved in said tri-allylisocyanurate.

6. A process for the preparation of thermosetting resin compositions according to claim 2, wherein the heating dissolution of said polymaleimide and said tri-allylisocyanurate is carried out at 80° to 130° C.

7. A cured product obtained by heating a thermosetting resin composition comprising an admixture consisting of tri-allylisocyanurate and a polymaleimide represented by the following general formula:

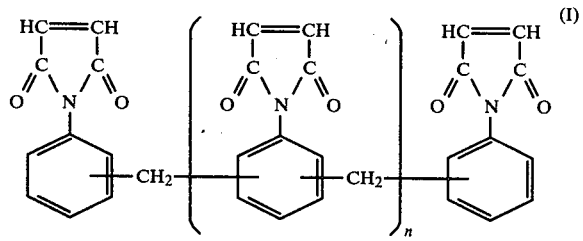

wherein n is a number of at least 1, the amount of tri-allylisocyanurate being 3 to 300 parts by weight per 100 parts by weight of polymaleimide.

8. A cured product as set forth in claim 7, wherein said thermosetting resin composition further comprises a radical-polymerizable thermosetting resin and/or a filler.

9. A cured product as set forth in claim 7, wherein said thermosetting resin composition is heated and cured at 150° to 180° C.

10. A thermosetting resin composition comprising an admixture consisting essentially of tri-allylisocyanurate, a polymaleimide represented by the following general formula:

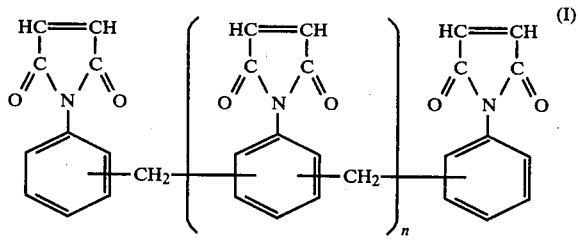

wherein n is a number of at least 1, and a radical polymerization initiator, the amount of tri-allylisocyanurate being 3 to 300 parts by weight per 100 parts by weight of polymaleimide.

11. A thermosetting resin composition comprising an admixture consisting essentially of tri-allylisocyanurate, a polymaleimide represented by the following general formula:

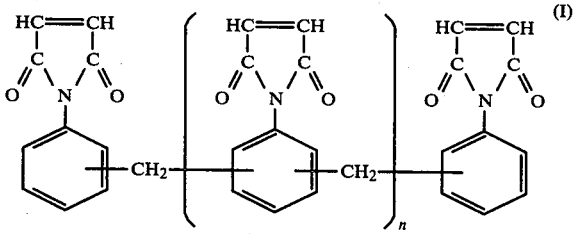

wherein n is a number of at least 1, a radical polymerization initiator and a radical polymerization thermosetting resin, the amount of tri-allylisocyanurate being 3 to 300 parts by weight per 100 parts by weight of polymaleimide.

12. A thermosetting resin composition comprising an admixture consisting essentially of tri-allylisocyanurate, a polymaleimide represented by the following general formula:

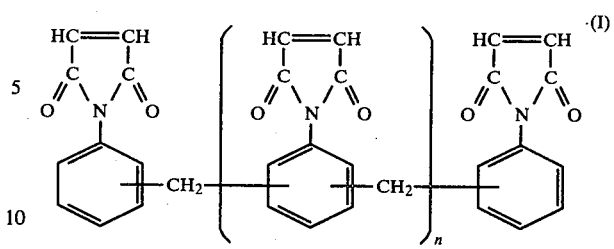

wherein n is a number of at least 1, a radical polymerization initiator, radical polymerizable thermosetting resin, and a filler, the amount of tri-allylisocyanurate being 3 to 300 parts by weight per 100 parts by weight of polymaleimide.

13. A thermosetting resin composition comprising an admixture consisting essentially of tri-allylisocyanurate, a polymaleimide represented by the following general formula:

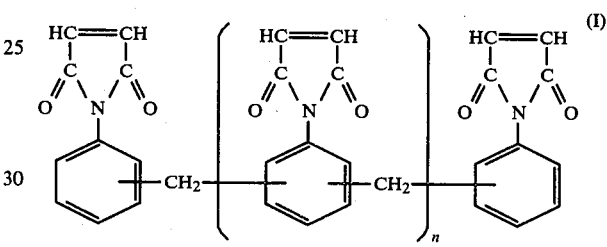

wherein n is a number of at least 1, and a bismaleimide compound represented by the following general formula:

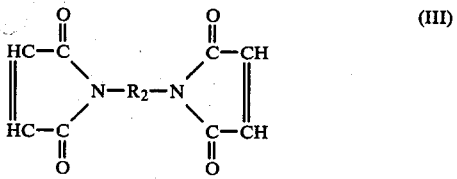

wherein $R_2$ stands for an alkylene group, an arylene group or an aralkylene group, a radical polymerization initiator, and a radical polymerizable thermosetting resin, the amount of tri-allylisocyanurate being 3 to 300 parts by weight per 100 parts by weight of polymaleimide and bismaleimide.

14. A thermosetting resin composition comprising an admixture consisting essentially of tri-allylisocyanurate, a polymaleimide represented by the following general formula:

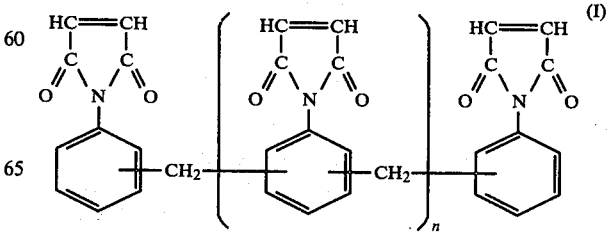

wherein n is a number of at least 1, a bismaleimide compound represented by the following general formula:

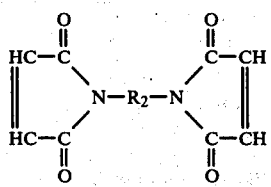 (III)

wherein $R_2$ stands for an alkylene group, an arylene group or an aralkylene group, a radical polymerization initiator, a radical polymerizable thermosetting resin and a maleimide compound represented by the following general formula:

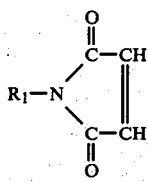 (II)

wherein $R_1$ stands for an alkyl group, an aryl group or an aralky group, the amount of tri-allylisocyanurate being 3 to 300 parts by weight per 100 parts by weight of polymaleimide, bismaleimide compound and maleimide compound.

15. A thermosetting resin composition comprising an admixture consisting essentially of tri-allylisocyanurate, a polymaleimide represented by the following general formula:

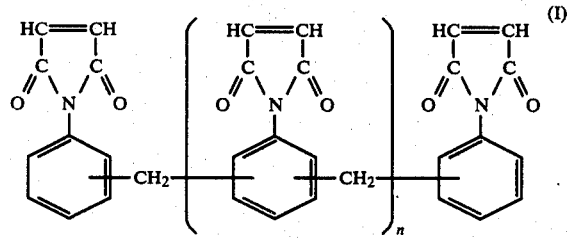 (I)

wherein n is a number of at least 1, a radical polymerization initiator, radical polymerizable thermosetting resin, filler and a bismaleimide compound represented by the following general formula:

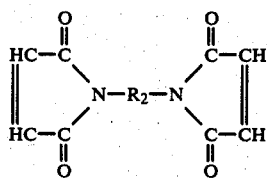 (III)

wherein $R_2$ stands for an alkylene group, an arylene group or an aralkylene group, the amount of tri-allylisocyanurate being 3 to 300 parts by weight per 100 parts by weight of polymaleimide and bismaleimide.

16. A thermosetting resin composition comprising an admixture consisting essentially of tri-allylisocyanurate, a polymaleimide represented by the following general formula:

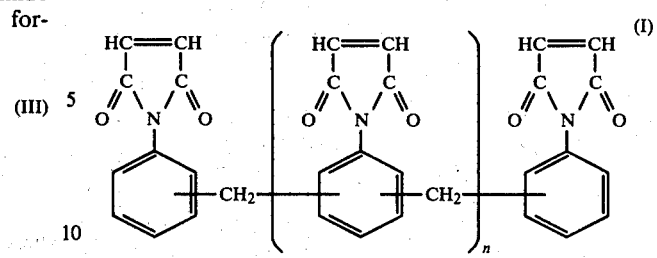 (I)

wherein n is a number of at least 1, radical polymerization initiator, radical polymerizable thermosetting resin, filler, a bismaleimide compound represented by the following general formula:

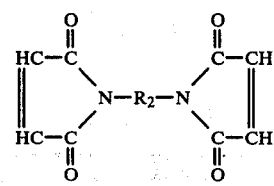 (III)

wherein $R_2$ stands for an alkylene group, an arylene group or an aralkylene group and a maleimide compound represented by the following general formula:

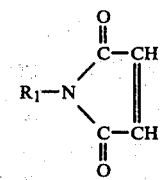 (II)

wherein $R_1$ stands for an alkyl group, an aryl group or an aralkyl group, the amount of tri-allylisocyanurate being 3 to 300 parts by weight per 100 parts by weight of polymaleimide, bismaleimide compound and maleimide compound.

17. A thermosetting resin composition as set forth in any one of claims 10 to 16, wherein said radical polymerization initiator is a member selected from the group consisting of organic azo compounds and organic peroxides.

18. A thermosetting resin composition as set forth in any one of claims 10 to 16, wherein the amount of tri-allylisocyanurate within said composition is within a range of 3 to 300 parts by weight per 100 parts by weight of polymaleimide.

19. A thermosetting resin composition as set forth in any one of claims 11 to 16, wherein said radical polymerizable resin is a member selected from the group consisting of unsaturated polyesters, epoxy acrylate resins and diallylphthalate resins.

20. A thermosetting resin composition as set forth in any one of claims 12, 15 and 16, wherein said filler is at least one member selected from the group consisting of a thermoplastic resin, an inorganic powder and a fibrous material.

21. A thermosetting resin composition as set forth in any one of claims 12, 15 and 16, wherein an amount of said filler is 10 to 75% by volume based on the total resins.

22. A thermosetting resin composition as set forth in any one of claims 11 to 16, wherein the sum of polymaleimide and tri-allylisocayanurate is 60 to 95% by weight based on the total resins.

23. A thermosetting resin composition as set forth in any one of claims 13, 14, 15 and 16, wherein n is 1, the molar ratio of polymaleimide to bismaleimide is at least 1/9.

24. A thermosetting resin composition as set forth in claim 23, wherein the bismaleimide compound is a compound represented by the formula:

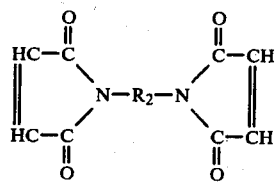
(III)

wherein $R_2$ stands for an alkylene group, an arylene group or an aralkylene group.

* * * * *